F. A. BAYNES.
OIL BURNER FOR LAMPS AND STOVES.
APPLICATION FILED SEPT. 24, 1908. RENEWED MAY 22, 1911.
1,122,060.
Patented Dec. 22, 1914.
2 SHEETS—SHEET 2.
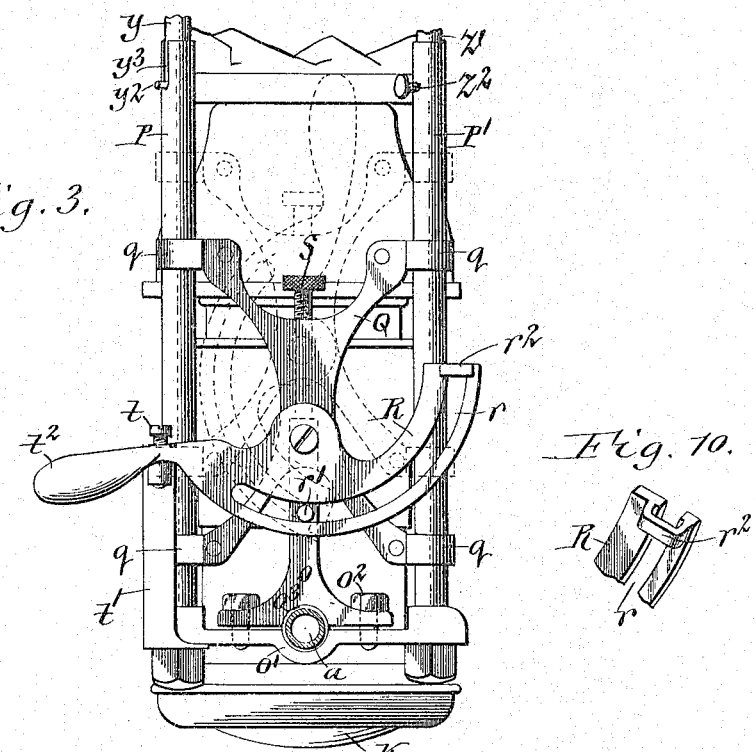
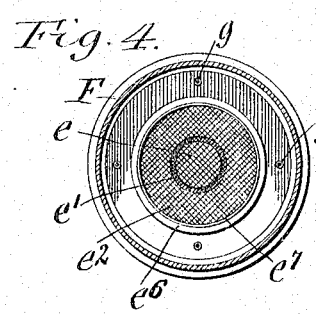
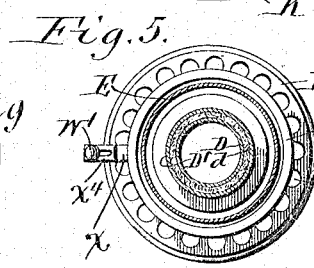
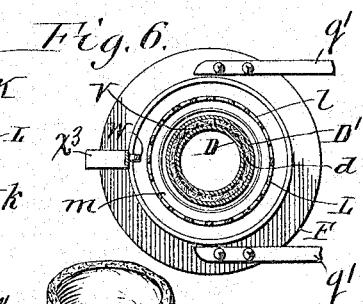
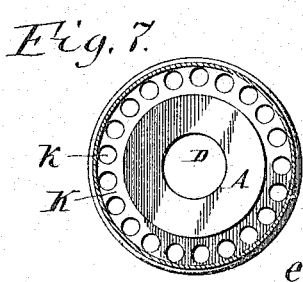
Witnesses:—
Richard Sommer
Gustav W. Hora
Inventor
F. A. Baynes,
by Seyer & Popp
Attorneys

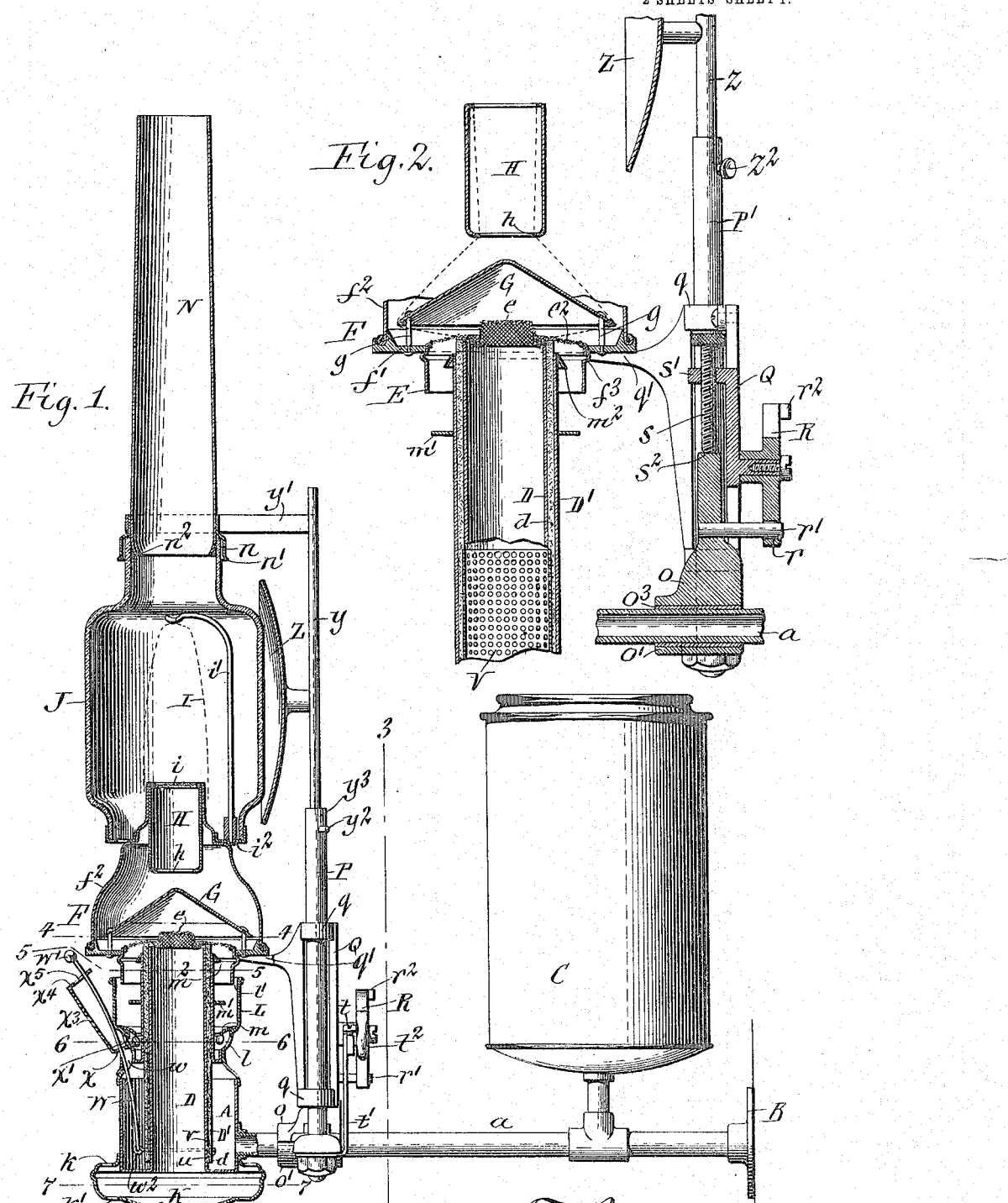

UNITED STATES PATENT OFFICE.

FREDERICK A. BAYNES, OF BUFFALO, NEW YORK.

OIL-BURNER FOR LAMPS AND STOVES.

1,122,060.　　　　　　Specification of Letters Patent.　　Patented Dec. 22, 1914.

Application filed September 24, 1908, Serial No. 454,532. Renewed May 22, 1911. Serial No. 628,891.

*To all whom it may concern:*

Be it known that I, FREDERICK A. BAYNES, a citizen of the United States, residing at Buffalo, in the county of Erie and State of New York, have invented a new and useful Improvement in Oil-Burners for Lamps and Stoves, of which the following is a specification.

This invention relates to an oil burner for lamps and stoves of the general character shown and described in Letters Patent No. 871,100 granted to myself November 19, 1907.

The object of this invention is to improve this class of oil burners with a view of increasing its illuminating efficiency, and to enable the burner to be manipulated more readily in lighting and extinguishing the same.

In the accompanying drawings consisting of 2 sheets: Figure 1 is a vertical longitudinal section of my improved burner applied to a lamp. Fig. 2 is a similar section of part of the burner, on an enlarged scale. Fig. 3 is a vertical transverse section in line 3—3, Fig. 1 looking forwardly. Figs. 4 and 5 are horizontal sections in the correspondingly numbered lines in Fig. 1, looking downwardly. Figs. 6 and 7 are horizontal sections in the correspondingly numbered lines in Fig. 1 looking upwardly. Fig. 8 is a perspective view of the means for adjusting the wick. Fig. 9 is a fragmentary side view of the holder or hood which supports the generator screen. Fig. 10 is a fragmentary perspective view of the cam whereby the upper parts of the burner are raised and lowered. Fig. 11 is a fragmentary section, on an enlarged scale, of the generating screen and its supporting hood and the dome.

Similar letters of reference indicate corresponding parts throughout the several views.

A represents the oil pot of the lamp or stove which may be supported in any suitable manner. In the drawings this oil pot has its lower end connected with one end of a horizontal oil supply pipe $a$ the opposite end of which is connected by means of a plate or bracket B to a wall or other support. Between the oil pot and the bracket B the pipe $a$ is connected by a T-coupling or other means with the underside of an oil reservoir C from which the oil is supplied to the oil pot.

D represents an upright inner air flue or wick tube which opens at its lower end through the bottom of the oil pot and terminates at its upper end above the top of the same.

$D^1$ represents an outer wick tube surrounding the inner wick tube and secured to the oil pot.

$d$ represents a tubular wick which is arranged in the annular space between the inner and outer wick tubes and dips at its lower end in the oil contained in the pot.

In the normal operative position of the wick the inner wick tube extends nearly to the upper end of the wick so that practically no part of the bore or inner side of the wick is exposed but the outer wick tube terminates at a considerable distance below the upper end of the wick, so that a considerable part of its periphery or outer side is exposed.

Above the upper ends of the wick and wick tubes is arranged a vapor generating screen which is preferably constructed of woven wire, and which comprises a screen body $e^2$ of annular form having at its inner edge portion a downwardly projecting annular bead $e^1$ adapted to lie close to the inner upper corner of the wick but not engage the upper end of the inner wick tube, this screen also having in the form shown a central crown $e$. The screen body $e^2$ is preferably downwardly and outwardly inclined, and rests on or immediately adjacent to the upper end of the wick, while its outer edge extends beyond the periphery of the wick and the outer wick tube, and has an annular rim $e^3$ extending down from the edge of the screen body and forming an outwardly facing annular shoulder $e^4$ on the screen between its body and rim. The rim of the screen is fastened in a channel-shaped binding $e^5$ preferably of metal which keeps the edge of the screen from raveling and also stiffens the same.

E represents a cylindrical hood which supports the generating screen. The screen is arranged in the upper end of the hood and secured therein by an inwardly turned flange $e^6$ at the upper edge of the hood engaging with the upper side of the binding and having an upwardly turned inner rim $e^7$ which bears against the shoulder $e^4$ of the screen and indentations or projections $e^8$ on said hood bearing against the underside of the binding, as shown in Fig. 11. The hood is detachably secured in an opening $f$ formed centrally in the horizontal circular bottom $f^1$ of a dome F, the side wall $f^2$ of which tapers upwardly from the periphery of said bottom. The upward movement of the screen hood in the dome bottom is limited by means of an annular bead or stop $f^3$ formed on the periphery of the hood and adapted to engage with the underside of the dome bottom and the hood is frictionally held in this bottom together with the screen supported thereon by one or more spring lips $f^4$ stamped out of the side of the hood and engaging with the edge of the central opening $f$ in the dome bottom, as shown in Figs. 2 and 11. This means of securing the screen carrying hood in the dome bottom permits of readily removing and restoring the same for cleaning, inspection and repairs.

By providing a bead $e^1$ on the screen the air supplied by the inner wick tube is deflected by this bead outwardly over the upper, inner edge of the wick, thus holding together the generated gases and preventing backing down of the gases into the inner wick tube. This also insures a more positive mixture, the bead also preventing and shutting off all flame from the inside or upper inner corner of the wick.

Within the dome and above the screen is arranged an upwardly dished or tapering spreader or deflector G which is constructed in the form of a true cone, the upper convex and under concave sides of which present straight lines extending downwardly from the apex, so that its base edge is the lowermost part of the spreader or deflector. The lower edge of the conical deflector or spreader is preferably at about the level of the top of the screen body where the wick contacts with or is closely adjacent to it during the operation.

Extending downwardly from the upper narrow end of the tapering wall of the dome is a concentrating tube H the lower end of which terminates in the central part of the dome above the spreader and is provided with an inwardly-turned flange $h$. At the upper end of the dome and concentrator, a horizontal guard screen $i$ is arranged over which is placed the incandescent mantle I. This mantle is supported in the usual manner at its upper end by means of an upright rod $i^1$ rising from a gallery $i^2$ arranged on the upper part of the dome. This gallery also supports the lower chimney J which may be of glass or other transparent material.

In the operation of this burner when the same is lighted, a flame is burning only on that part of the periphery or outer side of the wick which is exposed between the upper edge of the outer wick tube and the underside of the rim of the generating screen. The upper edge of the wick is prevented from burning by the generating screen resting on or closely adjacent thereto and a flame is also prevented from being maintained on the small exposed surface of the bore or inner side of the wick at the upper end thereof by reason of the downwardly projecting bead of the generating screen which lies sufficiently close to the bore of the wick for this purpose. By this means the flame is confined to the outer side of the wick where it can burn to produce the maximum volume of gas, but the flame is prevented by the screen from reaching the gases above the screen and igniting the same. In addition to preventing the wick from burning on its inner side the annular bead also serves to stiffen the generating screen and prevent distortion thereof.

While the flame is burning on the outer side of the wick it is supplied with air drawn upwardly through the hood, a part of this air also passing upwardly through the body of the generating screen and arranging itself on the outer or underside of the annular stream of gas or vapor which issues from the wick. The air drawn through the central tube passes upwardly and laterally through the crown of the generating screen and arranges itself on the inner or upper side of the annular stream of vapor or gas issuing from the wick. The inner and outer layers of air together with the combustible hydrocarbon vapor between them pass from the upper side of the generating screen laterally in all directions toward the lower edge of the spreader around which they are drawn upwardly into the space within the dome above the spreader. As the inner and outer streams of air pass through the generating screen they become heated by the screen and the flame of the wick and thereby are in the best condition for becoming mixed with the hydrocarbon vapor between the same. The inner and outer layers of air and the intermediate layer of combustible vapor pass in a straight line from a point adjacent to the upper end of the wick to the lower edge of the deflector or spreader. By reason of the conical formation of the deflector and the inclination of the flange and depression of the rim of the generating screen all surfaces lying adjacent to the path of the air and vapor are removed as far as possible from this path so that practically no frictional resistance is offered to the movement of this air and vapor.

Owing to this construction the layers of hot air and vapor in being drawn from the wick to the lower edge of the deflector do not engage on their upper and lower sides with fixed surfaces but only engage with the cushions of air lying adjacent thereto between which the hot air and gas can move with a minimum amount of friction.

By forming an upwardly projecting rim on the flange of the hood and engaging the same with the shoulder $e^4$ of the generating screen the outer current of air is confined closer to the flame of the wick so as to become heated more intensely while passing through the screen and before the same passes around the lower edge of the spreader, thereby promoting the mixture of the same with the gas. While thus passing from the wick to the lower edge of the deflector, the inner and outer streams of air and the intermediate stream of vapor are gradually drawn out into a thin film and the two streams of air by impinging against the opposite sides of the vapor become intimately mixed with the same and thus produce a combustible mixture of the highest heat producing qualities. After the mixture of air, gas or vapor passes around the lower edge of the deflector, it is drawn inwardly and upwardly in straight lines from the lower edge of the deflector to the inwardly-turned lower flange of the concentrator and is drawn upwardly around this flange through the upper guard screen to the mantle where it is ignited. During its passage from the lower edge of the deflector to the lower edge of the concentrator the hot combustible gaseous mixture does not engage with the upper side of the deflector nor the inner side of the wall of the dome, but passes freely between cushions of air which offer the least possible resistance to the upward movement of the hot gas. As this has passed upwardly around the lower inwardly turned edge of the concentrator it also moves between a layer of air lying against the bore of the concentrator and a layer of air lying in the center of the concentrator, so that the hot gas does not encounter any fixed surfaces which otherwise would produce friction and retard the free upward movement of the same. By thus reducing to a minimum the resistance which the hot gaseous mixture encounters in its passage from the wick to the mantle, this mixture is able to move with the greatest velocity, enabling the maximum volume of air and gas to be drawn quickly through the passages and before it has cooled perceptibly so that the same reaches the mantle in the most fit condition for complete combustion and developing the greatest number of heat units for rendering the mantle incandescent.

To prevent sudden gusts of wind from interfering with the regular flow of air through the central air flue, an annular air chamber K is applied to the lower end of the central air tube and oil pot which air chamber projects laterally beyond the oil pot and is provided on its upper and lower sides adjacent to its periphery with annular rows of upper and lower air inlet openings $k$, $k^1$. Any wind blowing downwardly through the upper opening $k$ will escape through the lower openings $k^1$ and any wind blowing upwardly through the lower openings will escape through the upper openings so that in either case the air in the central tube is not perceptibly effected by blasts of air.

The passage of air to the hood for supplying the flame of the burner is also controlled so as to avoid any irregularity in the supply of air at this point and thus insure uniformity in the generation of gas and the operation of the burner. The preferred means for this purpose, shown in the drawings, consist of an annular bonnet L surrounding the outer wick tube between the screen hood and the oil pot and provided at its lower end with an annular row of air inlet openings $l$ while its upper end is separated from the lower edge of the screen hood by an annular air inlet passage $l^1$, a lower baffle flange $m$ being shown as arranged on the inner side of the bonnet over its lower air inlet openings, and an annular intermediate baffle flange $m^1$ secured to the periphery of the outer wick tube and overhanging the lower baffle $m$, I also use an upper annular baffle flange $m^2$ secured to the upper edge of the outer wick tube and inclined downwardly and outwardly therefrom. Any air entering through the lower inlet openings $l$ of the bonnet is first obliged to pass the baffle or baffles before it can reach the flame of the wick and any air entering through the upper annular air inlet $l^1$ of the bonnet is first compelled to pass around the lower edge of the screen hood before it can reach the flame so that in either case the air becomes steady before it reaches the flame and therefore does not permit of fluctuation in the generation of gas and burning of the lamp. As the air strikes the baffle on the outer wick tube and bonnet the same cools the lower parts of the burner and thereby avoids the danger of explosion.

In order to increase the draft through the lamp, an upper or supplemental chimney N is employed which is preferably constructed of sheet metal or other non-transparent material. This chimney preferably tapers upwardly and is detachably connected with the upper end of the lower chimney by means of an annular groove $n$ which is formed at the lower end of the upper chimney and receives the upper end of the lower chimney. This groove is preferably formed between the lower end of the upper chimney and an annular rim $n^1$ secured to the outer side of the upper chimney adjacent to its lower end.

At its lower end the upper chimney is provided with an inwardly projecting annular flange $n^2$. As the burnt gases leave the upper end of the lower chimney, they pass along the edge of the flange $n^2$ and are directed toward the flange of the upper chimney, whereby these gases are prevented from frictionally engaging the bore of the upper chimney and only pass along the cushion of air lying next to the upper chimney, thereby enabling the burnt gases to escape with the greatest freedom and insuring a strong draft through the burner and lamp.

In the operation of starting the generation of gas and lighting the lamp, the dome and generator screen together with the parts connected therewith are first lifted to afford access to the wick, after which the latter is raised far enough to permit of lighting the same. After the wick is lighted, the same is turned down, so that the upper end of the same is on a level with the upper end of the outer wick tube—during which time the upper chimney remains over the lower chimney, so as to produce a good draft and promote the burning of the wick flame. The dome and generating screen together with the parts mounted thereon are now lowered until said screen is within a short distance above its lowermost position, so as to enable the flame of the wick to warm up the generating screen quickly and create a strong draft through dome and chimney. The wick is now raised so that its upper end is within a short distance from the underside of the generator screen, thereby causing sufficient gas to be generated to make it possible to light the mantle. After the generation of gas has commenced, the upper chimney is moved laterally away from the lower chimney to afford access to the mantle for lighting the gas in the same which has in the meantime risen from the wick. The upper chimney is now replaced over the lower chimney, and the upper parts of the lamp or burner are lowered, so that the generating screen engages with the upper end of the wick and pushes the same downwardly, and the upper end of the wick is nearly flush with the upper end of the inner air tube at which time the operation of lighting the burner and the lamp is completed.

Any suitable means may be provided for raising and lowering the upper parts of the burner and lamp, the means shown in the drawings being suitable for this purpose and constructed as follows: $o$, $o^1$ represent the upper and lower sections of a bracket which are clamped against opposite sides of the oil supply pipe adjacent to the oil pot by means of screws $o^2$ or otherwise. A sleeve $o^3$ of paper or other non-conductor of heat is preferably interposed between the periphery of this pipe and the parts of the bracket, so that any heat which is transmitted to this bracket by the upper parts of the lamp will not be transmitted to the oil pot and reservoir, thereby avoiding dangerous heating of the oil supply. On opposite sides of the oil supply pipe the lower section of the supporting bracket is provided with two upright hollow posts P, $P^1$ which receive the eyes or sleeves $q$ of a vertically-movable carriage Q which is guided by means of these collars on said posts. The latter are preferably sprung slightly out of their normal vertical position, so as to create friction between the same and the collars of the carriage, whereby the latter is prevented from moving too freely in raising and lowering the same together with the parts mounted thereon. Near the upper end of its front side the carriage is provided with two forwardly-projecting arms $q^1$ which are secured to the under side of the bottom of the dome and thus support the upper parts of the burner and lamp.

R represents a cam lever pivoted on the rear side of the carriage and provided with a cam slot $r$ which receives a pin or projection $r^1$ on the rear side of the upper bracket section $o$. Upon turning this cam lever in one direction or the other the carriage and the parts mounted thereon are raised or lowered. To permit of removing the carriage upwardly from the guide posts without detaching the cam lever therefrom, the cam slot of the same is extended to one end thereof, thereby permitting the cam lever to be disengaged from the pin $r^1$ without necessitating the removal of the cam lever from the carriage. For the purpose of stiffening the parts of the cam lever on opposite sides of its cam slot, a laterally projecting bridge or brace $r^2$ connects the parts of the lever on opposite sides of the outlet portion of its cam slot, as shown in Fig. 10, which bridge or brace is cleared by the pin $r^1$ of the bracket section $o$ upon assembling or dismembering the parts.

$s$ is a main stop which arrests the downward movement of the upper parts of the lamp and burner when the generating screen is in the position which it occupies while in normal use. This stop preferably is made adjustable and is constructed in the form of a screw which works in a forwardly projecting lug $s^1$ on the carriage and is adapted to bear against a shoulder or abutment $s^2$ on the upper section $o$ of the supporting bracket. For the purpose of arresting the downward movement of the generating screen before it touches the wick for effecting the preliminary generation of gas, an auxiliary or supplemental stop $t$ is provided. This auxiliary stop preferably consists of a screw which is mounted on a flexible finger $t^1$ rising from the lower section $o^1$ of the supporting bracket and which is normally in the path of the handle $t^2$ or other part of the lifting cam. During the operation of lighting the lamp, the cam lever is first turned until its arm strikes the auxiliary stop at which time the carriage has been lowered so as to stop the generating screen a short distance above the wick and thereby permit the flame to burn up and warm the screen quickly. The screen is left momentarily in this position and then the auxiliary stop is pushed to one side to permit the cam lever to continue its lowering movement until the carriage has reached its lowermost or normal position in which position it is arrested by means of the main stop engaging with the shoulder on the supporting frame.

Various means may be employed for raising and lowering the wick, the means for this purpose shown in the drawing being constructed as follows: V represents a perforated lifting tube or sleeve arranged within the lower part of the wick and $u$ is a collar or band of wire or similar material which encircles the wick at the lower end thereof, so as to secure the same on the lifting tube. W represents the upright wick lifting or shifting rod which passes through an opening $w$ in the upper front part of the oil pot and is provided at its upper end with a finger piece $W^1$ while its lower end has a hook or off-set portion $w^3$ which is adapted to engage with an eye $w^2$ on the wick collar and form a detachable connection between the shifting rod and wick and permit the lifting rod to be used in connection with a new wick which has previously been provided with a lifting tube and band.

Ordinarily the wick can be raised and lowered to any extent by only taking hold of the wick shifting rod. For the purpose, however, of avoiding undue lifting of the wick for lighting the same, a stop or gage device is provided which when in use limits the distance which the wick can be raised. This stop device preferably consists of a lower stop lug $x$ arranged in an opening $x^1$ formed in the bonnet on the oil pot and provided with an opening $x^2$ which receives the shifting rod, and a finger piece $x^3$ projecting upwardly from the outer end of the stop lug and provided with an inwardly projecting upper lug $x^4$ which has a transverse slot $x^5$ through which the shifting rod projects. When the finger piece and its lugs are free, the same turn by gravity into a position in which they are uncoupled from the shifting rod and the latter is free to slide vertically through the lugs. But when the finger is pressed inwardly against the finger piece, the lower lug grips the shifting rod so that the upward movement of the latter is limited by the lower stop lug $x$ striking the shoulder at the upper end of the opening $x^1$. The stop lug $x$ and rod W are thus coupled and raised simultaneously and the wick is also raised from the position in which its upper end is flush with the outer wick tube to a position in which it nearly touches the generating screen in the partly elevated position of the latter, whereby excessive raising of the wick at this time is prevented and proper ignition and burning of the lamp is insured. Upon releasing the stop device after the wick has been raised to the fullest extent permitted by the stop device the latter slides by gravity into its lowermost position on the wick shifting rod.

The upper chimney may be supported in various ways but preferably by means of a vertically movable rod $y$ guided in the post P of the supporting bracket and provided at its upper end with a horizontal arm $y^1$ which carries the upper chimney. On its side the supporting rod is provided with a pin $y^2$ which is adapted to engage with the longitudinal slot $y^3$ formed in the post P and extending downwardly from the upper edge of the same. While the chimney rod is lowered and its pin engages with the slot of the post P the upper chimney is held against turning. When it is desired to move the upper chimney out of the way to permit of lighting the mantle, the lower chimney with the rod $y$ is first raised together with the upper chimney until the pin $y^2$ is above the guide post P and upon then turning the rod together with the chimney so that the pin is out of register with the slot, this pin will engage with the upper end of the post and support the upper chimney in its elevated position as long as required.

A reflector Z is also preferably employed in rear of the lower chimney which reflector is supported on the upper end of a rod $Z^1$ which is adjustably secured in the other post $P^1$ by means of a set screw $Z^2$ or any other suitable means.

It will be noted that in this burner no metallic connections exist between the upper parts of the burner in which heat is developed and the lower part thereof containing the oil supply whereby all danger of overheating and explosions is avoided.

I claim as my invention:

1. A burner, comprising inner and outer wick tubes adapted to receive a wick between them, a generator screen adapted to rest directly over said tubes and which inclines downwardly to its outer edge, and a spreader above the wick and screen, the spreader having downwardly inclined spreading walls; substantially as described.

2. A burner, comprising inner and outer wick tubes adapted to receive a wick between them, and a generator screen arranged over the tubes and having a flange or bead extending into the inner tube in close proximity to the wick; substantially as described.

3. A burner comprising inner and outer wick tubes adapted to receive a wick between them, a generating screen adapted to rest on the upper end of the wick, a dome which receives said tubes, wick and screen, and an upwardly dished spreader arranged in the dome above the said tubes, wick and screen and having its edge arranged beyond the screen but separated from the wall of the dome by a passage which connects the spaces in the upper and lower parts of the dome, and a tubular concentrator projecting from the upper end of the dome downwardly into the central part of the same; substantially as described.

4. A burner comprising inner and outer wick tubes adapted to receive a wick between them, a generating screen adapted to rest on the upper end of the wick, a dome which receives said tubes, wick and screen, and an upwardly dished spreader arranged in the same above the said tubes, wick and screen and having its edge arranged beyond the screen but separated from the wall of the dome by a passage which connects the spaces in the upper and lower parts of the dome, and a tubular concentrator projecting from the upper end of the dome downwardly into the central part of the same and having an inwardly turned flange at its lower end; substantially as described.

5. The combination of an oil pot, wick tubes rising from the oil pot, an oil supply pipe connected with the oil pot, a dome having an opening in its bottom through which said tubes project, a generator screen adapted to rest on the upper end of the wick and supported on the dome, a supporting bracket, a carriage supporting said dome and movable vertically on said bracket, a main stop which arrests the downward movement of the carriage in the normal position of the same, and an auxiliary stop which limits the downward movement of the carriage before it reaches the normal position; substantially as described.

6. The combination of an oil pot, wick tubes rising from the oil pot, an oil supply pipe connected with the oil pot, a dome having an opening in its bottom through which said tubes project, a generator screen adapted to rest on the upper end of the wick and supported on the dome, a supporting bracket secured to said pipe but insulated therefrom, a carriage supporting said dome and movable vertically on the bracket, a cam for raising and lowering the carriage pivoted on the latter and engaging with the bracket, a main stop screw arranged on the carriage and adapted to engage the bracket when the dome reaches its normal position, and a retractable auxiliary stop screw adapted to be engaged by said cam and arrest the downward movement of the carriage before the dome reaches its normal position; substantially as described.

7. A burner comprising inner and outer wick tubes adapted to receive the wick between the same, a generating screen adapted to rest on the upper end of the wick, a hood carrying said screen, a baffle flange arranged on the periphery of the outer tube at the upper end thereof, and a bonnet surrounding the outer wick tube and provided at its lower end with air inlet openings while its upper end is separated from said hood by an air inlet passage; substantially as described.

8. A burner comprising inner and outer wick tubes adapted to receive the wick between the same, a generating screen adapted to rest on the upper end of the wick, a hood carrying said screen, a baffle flange arranged on the periphery of the outer tube at the upper end thereof, a bonnet surrounding the outer wick tube and provided at its lower end with air inlet openings while its upper end is separated from said hood by an air inlet passage, a baffle flange arranged on the inner side of the bonnet and overhanging said lower openings, and a baffle flange secured to the outer wick tube below said upper air passage and overhanging the lower baffle flange; substantially as described.

9. A burner comprising inner and outer wick tubes adapted to receive a wick between them, a generator screen adapted to rest on the upper end of the wick and inclined downwardly and outwardly therefrom, a dome which receives the screen, and a spreader within the dome and above the screen, the spreader having a downwardly inclined spreading wall terminating in an edge which is the lowest part thereof and which is located beyond the outer edge of the screen; substantially as described.

10. A burner comprising inner and outer wick tubes which are adapted to receive a wick between them, a generator screen arranged to lie closely above the upper end of the wick, a channel-shaped binding engaging the outer edge of the screen, and a cylindrical hood receiving said binding and having an inturned flange bearing against the upper side of said binding, and also having an upwardly turned rim at the inner edge of the inturned flange bearing against the shoulder of said screen; substantially as described.

11. A vapor generating burner, comprising inner and outer wick tubes, the outer tube terminating short of the top of the inner wick tube, and a generator screen including an annular portion and an inner down-turned bead portion arranged close to the inner upper corner of the wick when the screen is in generating position; substantially as described.

12. A vapor generating burner having inner and outer wick tubes, the outer wick tube terminating short of the top of the inner wick tube, and a generator screen having an annular portion adapted to fit closely above the upper end of the wick, said portion having an inner depressed bead portion close to the upper inner edge of the wick, the annular portion of the generator screen being inclined outwardly and downwardly; substantially as described.

13. In a mantle lamp, a vapor generating burner having inner and outer wick tubes, the upper end of the outer wick tube terminating short of the upper end of the inner wick tube, a transverse generator screen coacting with the top of the wick, and an outwardly extending annular baffle secured at or adjacent to the top of the outer wick tube and coacting with the generator screen to fix the width of the sub-flame on the screen; substantially as described.

14. A vapor generator burner having inner and outer wick tubes, a generator screen arranged to lie closely above the top of the wick, a baffle at or near the top of the outer wick tube and coacting with the screen to fix the width of the sub-flame on the screen, a hood depending below the generator screen, and a lower bonnet coacting with the hood and spaced therefrom to leave an air inlet between them; substantially as described.

15. A vapor generator burner having inner and outer wick tubes, a generator screen arranged to lie closely above the top of the wick, a baffle at or near the top of the outer wick tube and coacting with the screen to fix the width of the sub-flame on the screen, a hood depending below the generator screen, and a lower bonnet coacting with the hood and spaced therefrom to leave an air inlet between them, said bonnet having an annular row of air inlet openings through it; substantially as described.

16. A vapor generator burner having inner and outer wick tubes, a generator screen arranged to lie closely above the top of the wick, a baffle at or near the top of the outer wick tube and coacting with the screen to fix the width of the sub-flame on the screen, a hood depending below the generator screen, and an upwardly projecting bonnet coacting with the hood and having an annular row of air openings therethrough; substantially as described.

17. A vapor generator burner having inner and outer wick tubes, a generator screen arranged to lie closely above the top of the wick, said screen being secured at a fixed distance above the outer wick tube when in its lowered position to expose a predetermined length of wick between the screen and the outer tube, a hood depending below the generator screen, and a vertically extending bonnet of larger diameter than the hood, said bonnet surrounding the outer wick tube, and its upper end forming with the lower end of the hood a constricted air inlet opening; substantially as described.

18. In a vapor generator burner, inner and outer wick tubes, a vapor generating screen over the wick, a dome surrounding the space above the screen, a spreader within the dome over the screen and of larger diameter than said screen, and a concentrating tube within the upper end of the dome, the lower end of said tube being spaced apart from the dome to direct the upward gaseous flow away from the dome wall; substantially as described.

19. In a vapor generator burner, inner and outer wick tubes, a vapor generating screen over the wick, a dome surrounding the space above the screen, a spreader within the dome over the screen and of larger diameter than said screen, and a concentrating tube arranged centrally within the upper end of the dome, the lower edge of said tube being spaced apart from the dome to direct the upward gaseous flow away from the dome wall, said concentrating tube having a contracted lower opening; substantially as described.

20. A vapor generating burner, a dome inclosing the space above the generator screen, and a central concentrating tube projecting downwardly into the upper portion of the dome and fitting the lower end of the mantle, said dome being closed around the concentrator tube; substantially as described.

21. A vapor generator burner, having inner and outer wick tubes, a generator screen above and coacting with the tubes, a surrounding hood supporting the screen and carried independently of the wick tubes, and a lower bonnet coacting with the hood and supported independently thereof, there being an annular air space between the bonnet and hood; substantially as described.

Witness my hand this 21st day of September, 1908.

FREDERICK A. BAYNES.

Witnesses:
THEO. L. POPP,
ANNA HEIGIS.